July 27, 1937. B. H. FLYNN 2,088,369
DITCH GRADING OR CUTTING MACHINE
Filed Nov. 5, 1935 6 Sheets-Sheet 1

Inventor

B. H. FLYNN

Attorneys.

July 27, 1937.  B. H. FLYNN  2,088,369
DITCH GRADING OR CUTTING MACHINE
Filed Nov. 5, 1935  6 Sheets-Sheet 3

Inventor
B. H. Flynn
By H. Q. Willson &co.
Attorneys.

Inventor
B. H. FLYNN

July 27, 1937. B. H. FLYNN 2,088,369
DITCH GRADING OR CUTTING MACHINE
Filed Nov. 5, 1935 6 Sheets-Sheet 5
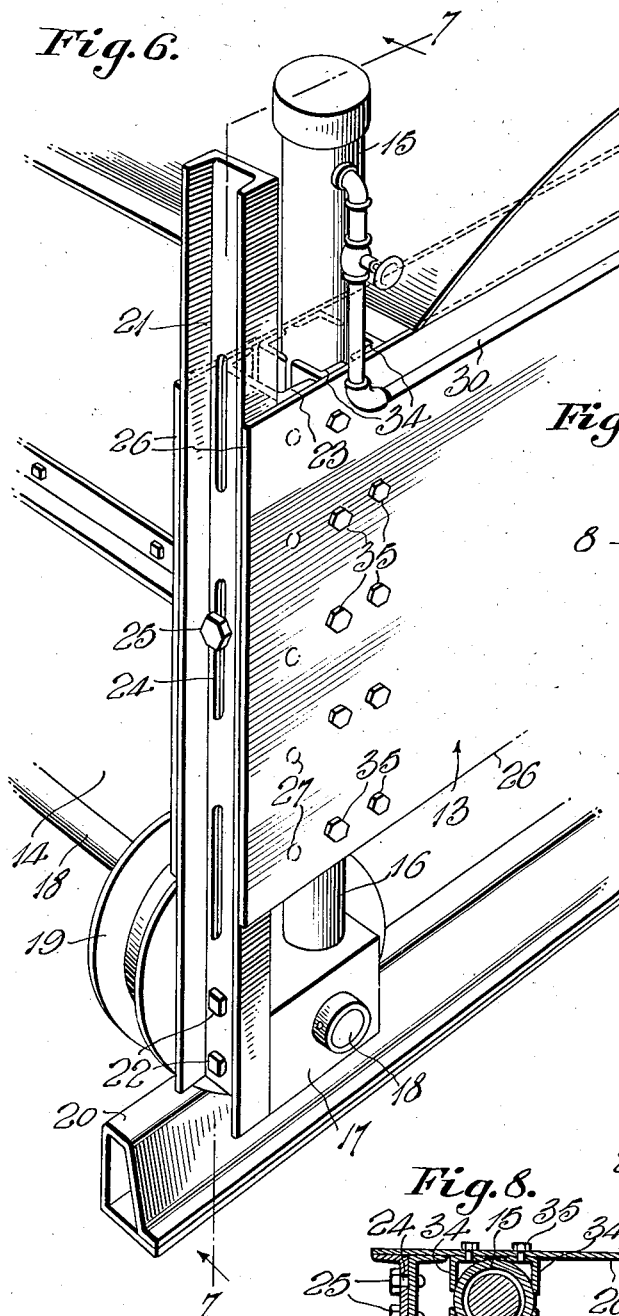
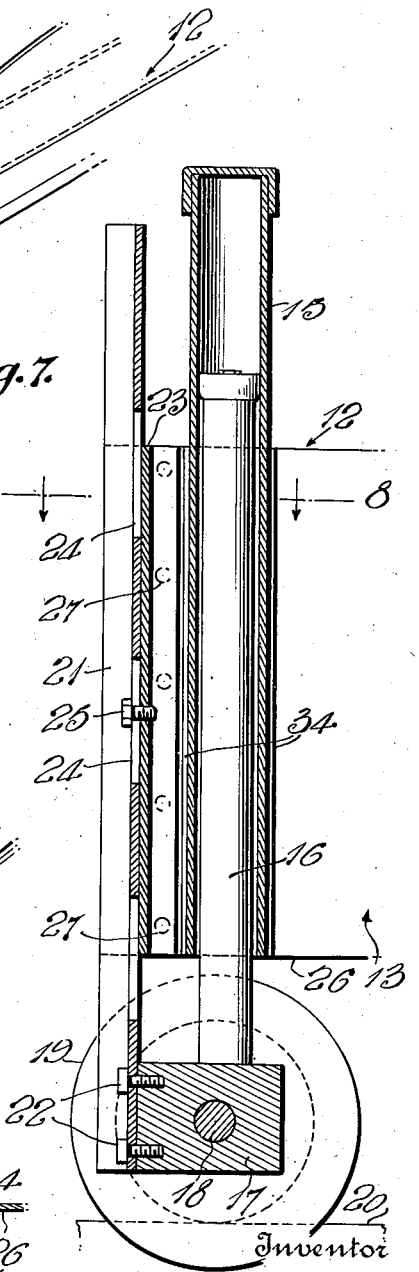
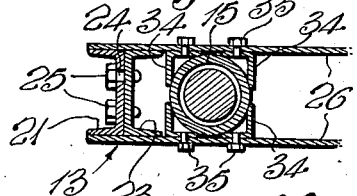

July 27, 1937. B. H. FLYNN 2,088,369
DITCH GRADING OR CUTTING MACHINE
Filed Nov. 5, 1935 6 Sheets-Sheet 6

Witness
H. Woodard

Inventor
B. H. FLYNN
By H. B. Wilson &co
Attorneys.

Patented July 27, 1937

2,088,369

UNITED STATES PATENT OFFICE 2,088,369

DITCH GRADING OR CUTTING MACHINE

Benjamin H. Flynn, Alexandria, La.

Application November 5, 1935, Serial No. 48,426

10 Claims. (Cl. 37—97)

The invention aims primarily to provide a new and improved machine for rapidly and efficiently digging ditches, trenches, and the like to accurate cross-section and conveying the dug earth laterally, in either or both directions, and loading it into trucks at either side of the machine if desired. One of the principal uses of the machine is in forming trenches to be lined with concrete for irrigation purposes, and a further aim is to provide for clean cuts along the sides of the trench regardless of roots and the like which may be encountered, such roots and the like being cleanly cut by downwardly delivered cutting strokes instead of being raggedly torn loose as done by other machines.

A wheeled frame is provided carrying a ditch digging drum, transverse conveying means for the dug earth, an engine, and driving connections from said engine to the digging drum, the conveying means and the wheeled supporting means of the frame; and further objects are to provide a novel structure in which the digging drum not only forms the ditch but pushes the dug earth upwardly along a back stop from which the earth discharges onto the conveying means; to make provision for so changing the digging drum as to dig the ditch of any one of a plurality of cross-sectional shapes; to provide a structure in which the "heels" of the drum-carried digging blades are located close to the axis of the drum and enter the earth ahead of the "toes" of said blades which are relatively distant from said axis, not only providing a shearing cut but offering less resistance to drum rotation as each blade initially cuts downwardly into the ground; to provide a plurality of jacks connecting the frame with its wheeled supporting means for raising and lowering the frame and the digging drum, and to provide for effectively bracing said jacks and locking said frame against vertical movement when adjusted to the desired elevation; and, for transportation purposes, to provide for mounting the drum on the frame in a position considerably above the position which the drum occupies on said frame when the machine is in use.

With the foregoing and minor objects in view, the invention resides in the novel subject matter hereinafter described and claimed, description being accomplished by reference to the accompanying drawings.

Fig. 6 is a perspective view showing the relation of one of the jacks and its bracing means with the frame and the wheeled supporting means.

Fig. 7 is a vertical sectional view on line 7—7 of Fig. 6.

Fig. 8 is a horizontal section on line 8—8 of Fig. 7.

Figure 1:
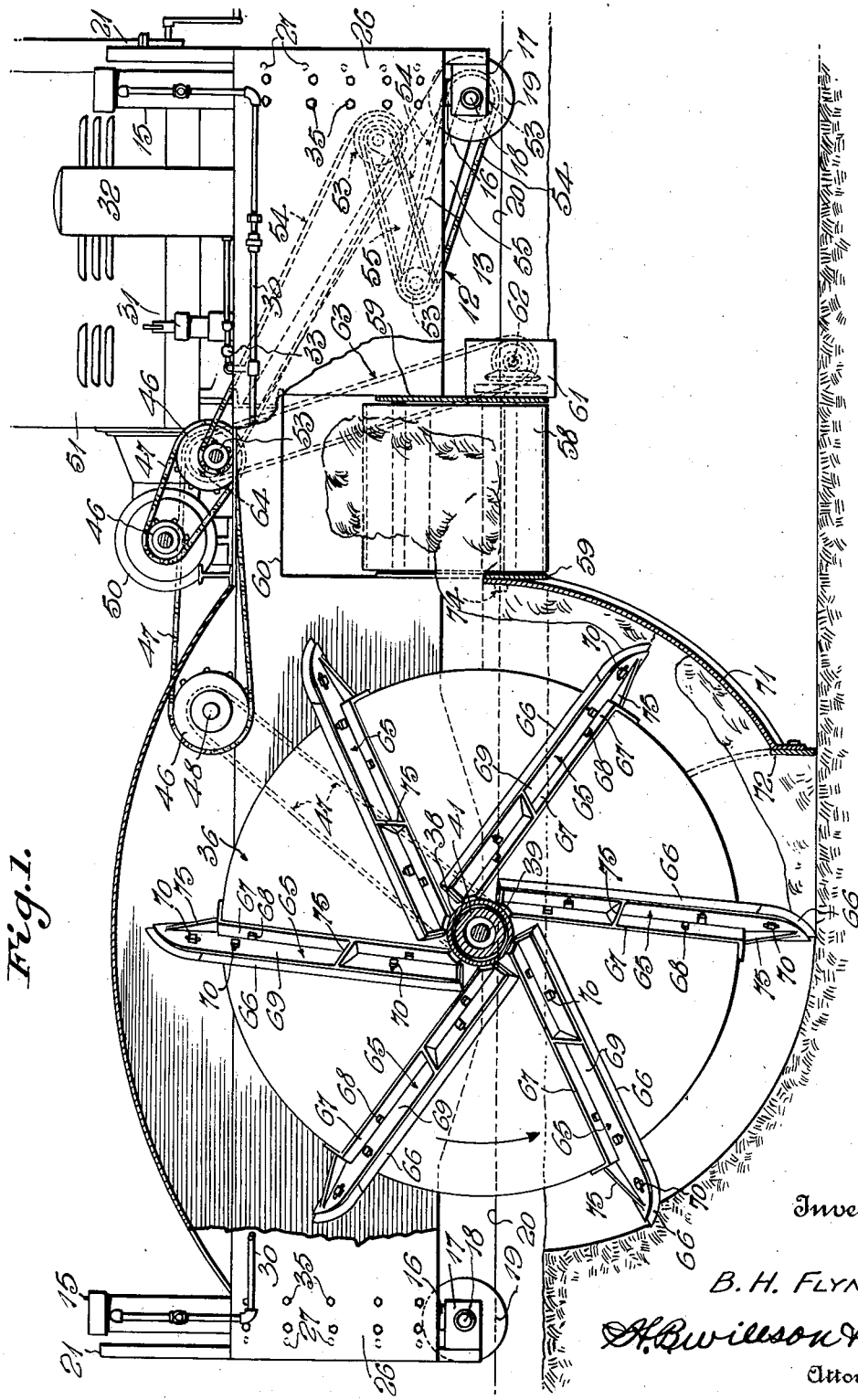
Fig. 1 is a side elevation partly broken away and in section.

A preferred construction has been illustrated and will be rather specifically described, with the understanding however, that within the scope of the invention as claimed, variations may be made.

A rigid rectangular frame 12 is provided having longitudinal side members 13 rigidly connected by transverse end members 14. Vertical jack bodies 15 are secured to the frame 12 at or near the four corners thereof, and vertical jack shanks 16 are slidably engaged with said jack bodies, the lower ends of said shanks 16 being provided with bearings 17 receiving the ends of axles 18 having flanged wheels 19 to travel upon straight tracks 20. If desired, however, the wheels 19 or their equivalents could well be engaged with endless tracks in the form of "caterpillar treads". Provision is made for vertically adjusting the jack bodies 15 upon the jack shanks 16 to raise and lower the frame 12, and I provide brace bars 21 for not only bracing said jack shanks when they are extended beyond the lower ends of the jack bodies 15, but for establishing fixed connections between the wheeled supporting means and the frame after the latter has been adjusted to the desired elevation. In the present showing, the bars 21 are rigidly secured at 22 to the bearings 17 and said bars lie slidably against vertical portions 23 of the frame 12. Vertical slots 24 are formed in the bars 21 and cap screws 25 pass through these slots and are threaded into the frame portion 23. Unless only a trivial vertical adjustment of the frame 12 is to be made, the cap screws 25 are entirely removed before vertically adjusting said frame. After adjustment to the desired elevation, the screws 25 are passed through the slots 24 and threaded into openings in the frame portions 23, thus rigidly clamping the bars 21 to said frame portions. This not only effectively braces the jack shanks 16, but holds the frame 12 against any vertical creeping from the position at which it has been set.

In the preferred construction, the side members 13 of the frame 12 include laterally spaced longitudinal plates 26 welded or otherwise secured against opposite sides of vertical channel bars, I-beams or the like. The frame portions 23 above described, are located near the ends of the plates 26, are in the form of channel bars, and are spot-welded at 27 to the plates 26. These plates project beyond the bars 23 so that these bars and the projecting plate portions form vertical channels in which the brace bars 21 are snugly received, said brace bars being preferably of channeled form as shown. Others of the vertical frame members between the plates 26, are shown in the form of channel bars 28 and still others are shown in the form of I-beams 29.

Hydraulic jacks are preferred, the cylinders thereof constituting the bodies 15 and the plungers the shanks 16, and suitable valved piping 30 and a pump 31 are provided to force oil into said cylinders from an oil tank 32 mounted on the frame 12, for the purpose of raising said frame with respect to its wheeled supporting means. When the frame is to be lowered, oil is returned from the cylinders to the tank 32, this being accomplished by opening a valve 33 (Figs. 1 and 2) and by-passing the oil through this valve around the pump 31. The cylinders 15 are preferably welded to angle metal bars 34 (see more particularly Figs. 6 and 8), said cylinders being interposed between the side plates 26, to which said bars 34 are secured by cap screws 35 or in any other desired way.

A ditch digging drum 36 is rotatably mounted between the side members 13 of the frame 12, upon a transverse axis, said drum having internal reinforcements 37 which are secured to a central tubular shaft 38. Stub-shafts 39 and 40 are suitably secured in the ends of the tubular shaft 38 and project therefrom, said shafts being rotatably mounted in bearings 41. These bearings are provided with carrying plates 42 welded or otherwise joined thereto and these plates normally lie against lower portions of the side members 13, to which they are secured by throughbolts 43 (see Figs. 2 and 4). When the machine is to be transported, however, the bolts 43 are removed with the drum 36 resting upon the surface of the ground, and the entire frame 12 is then lowered around said drum. This having been done, the bolts 43 are used to secure the plates 42 against upper portions of the side members 13 as seen in dotted lines in Fig. 4. Thus, when the frame 12 is elevated a slight amount, the drum 36 will clear the ground and the machine may be readily transported without necessarily having the jack shanks 16 extended to any great extent.

Figure 2:
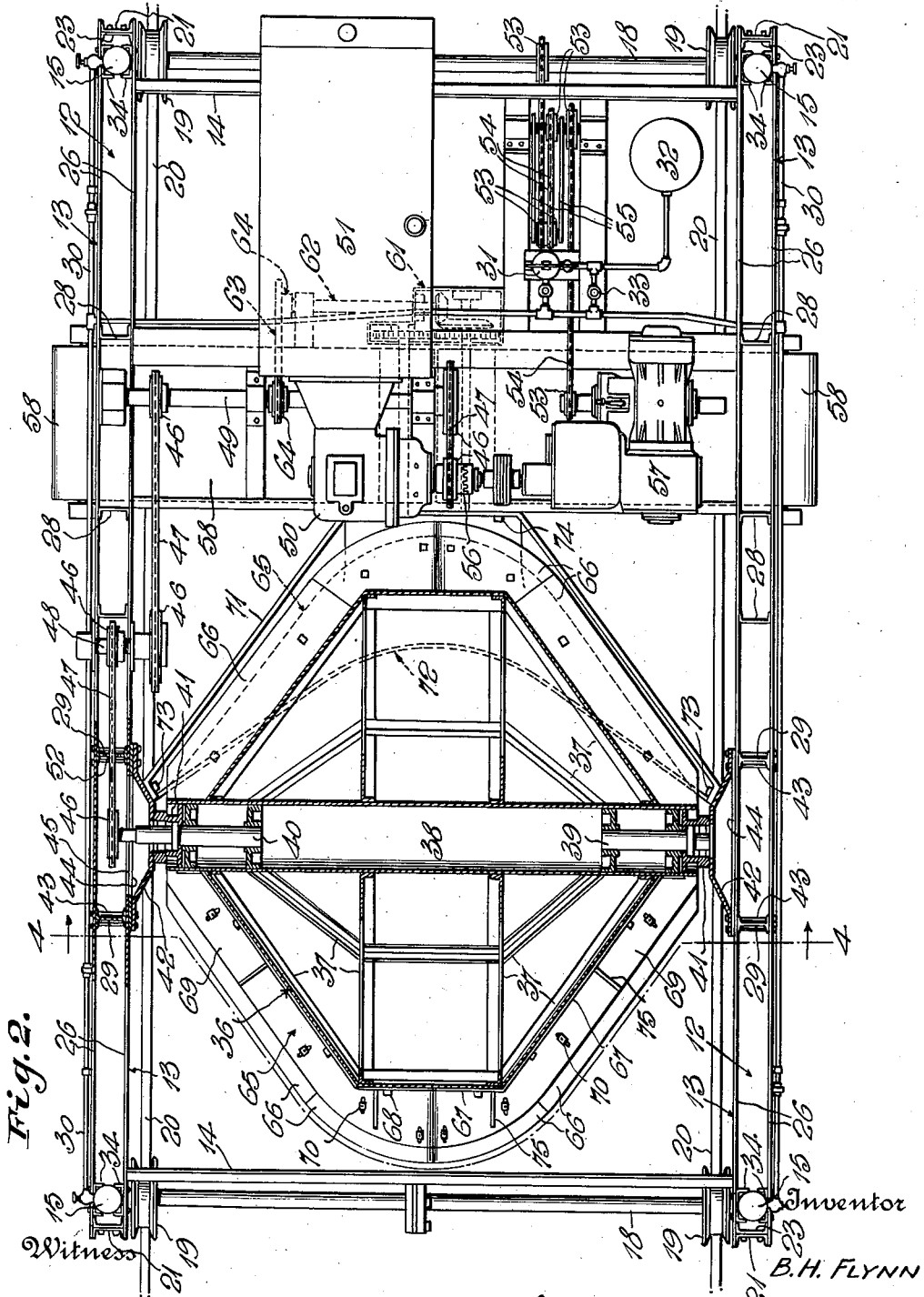
Fig. 2 is a top plan view partly in section.

The bolts 43 preferably straddle the webs of the I-beams 29 as shown in Fig. 2 and the portions of the innermost of the plates 26 adjacent the bearing supporting plates 42, are preferably reinforced by vertical plates 44 welded or otherwise secured thereto. One of these plates and the plate 26 against which it lies, are formed with a vertical opening or slot 45 through which the stub-shaft 40 passes as seen in Fig. 2, for engagement with the drum-driving connections, some of which are located between the side plates 26 of one of the side members 13. In the present showing, these driving connections consist of various sprockets 46, chains 47, a short transverse shaft 48, a relatively long transverse shaft 49, and a transmission mechanism 50 driven by a motor 51 mounted on the frame 12. One of the I-beams 29 is slotted at 52 to receive one of the chains 47.

Other driving connections are provided for driving one of the axles 18 regardless of the height to which the frame be adjusted, said driving connections being shown as consisting of several sprockets 53, chains 54, radius links 55 pivoted to frame and axle respectively, and pivoted to each other and carrying two of said sprockets, and a transmission mechanism 57 driven from the transmission 50 through the instrumentality of a suitable clutch 56. Both of the transmissions 50 and 57 are preferably of variable speed nature, so that the speed of the digging drum 36 and the forward propulsion of the machine may be varied according to the character of the earth being ditched.

Transverse endless conveyors 58 are mounted in a suitable transverse frame 59 extending between the side members 13 of the frame 12, said conveyors extending through openings 60 in said side members for laterally carrying the earth which is dug and elevated by the digging drum 30. Suitable driving connections are provided between the motor 51 and the conveyors 58, for driving said conveyors both in one direction, both in the other direction, or simultaneously in opposite directions, said connections being illustrated as consisting briefly of a transmission mechanism 61 having a drive shaft 62 which is driven by a chain 63 and sprockets 64 from the shaft 49. The conveyed dirt may if desired be discharged by the conveyors into trucks at one or both sides of the machine.

The drum 36 decreases in diameter from its central portion toward its ends, said central portion being preferably cylindrical and the end portions conical. This drum carries a plurality of angle metal blade-back-up-bars 65 to which cutting blades 66 are secured. Each bar 65 and its respective blade 66 extend from a point at one end of the drum 36 near the drum axis, across the drum periphery and to a corresponding point at the other end of the drum, and each bar and blade is so pitched on a line tangential to a relatively small circle concentric with the drum, that the "heel" of the blade (the ends thereof toward the drum axis) will strike the earth ahead of the "toe" (the intermediate portion) when the drum is in its intended relation with the surface of the ground. Thus, the blades not only exert a shearing cut on the earth but as the "heels" which strike the ground first are much closer to the drum axis than the "toes", less resistance is offered to drum rotation. The "relatively small circle" above mentioned is the periphery of the shaft 38 in the present disclosure. As the blades deliver their cuts downwardly instead of upwardly, roots and the like will be cleanly cut while solidly supported by the earth beneath, instead of being roughly torn loose and some left uncut as by other machines, obviating a lot of additional labor in preparing the ditch or the like for lining with concrete.

Figure 3:
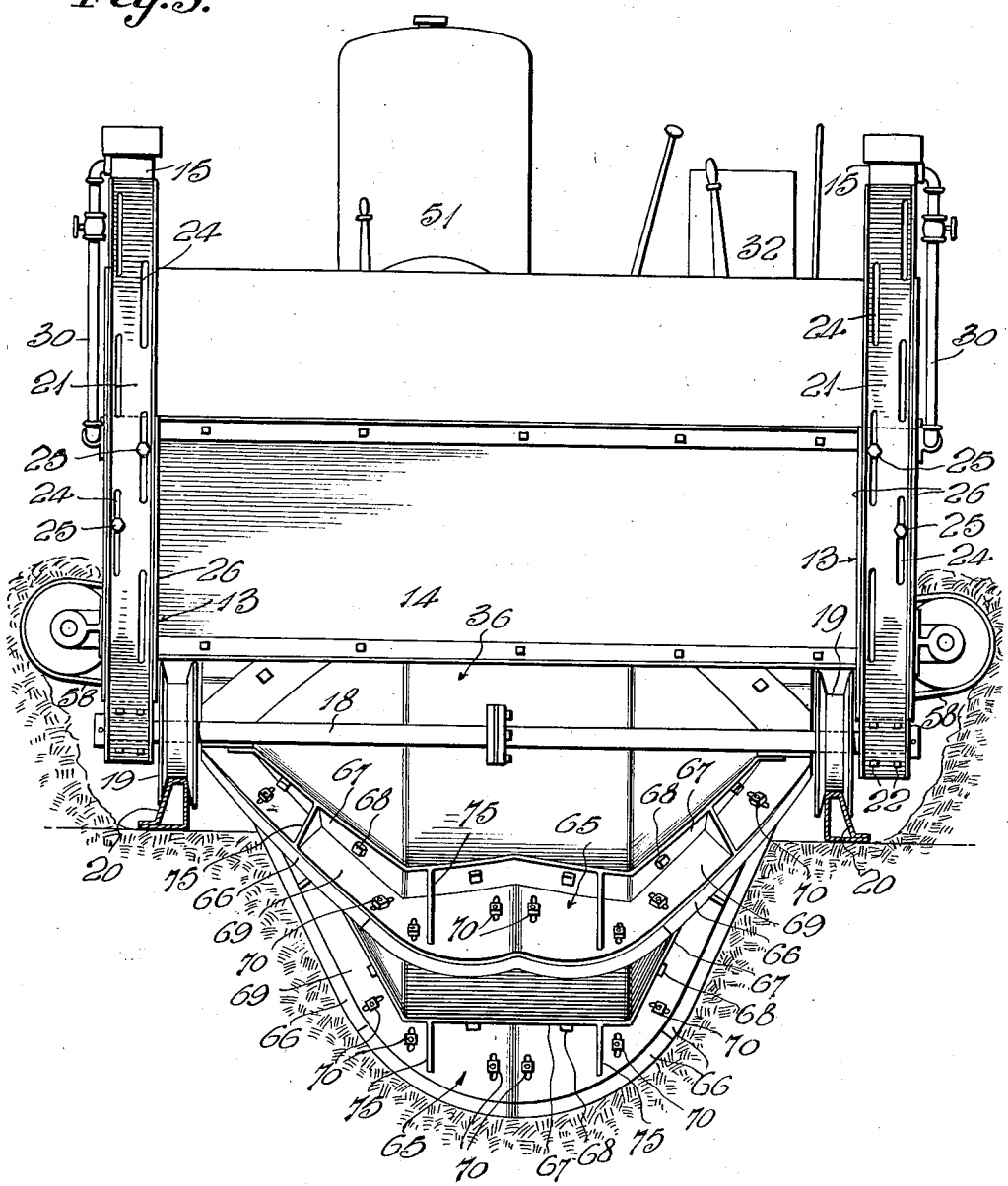
Fig. 3 is a front end elevation.
Figure 4:
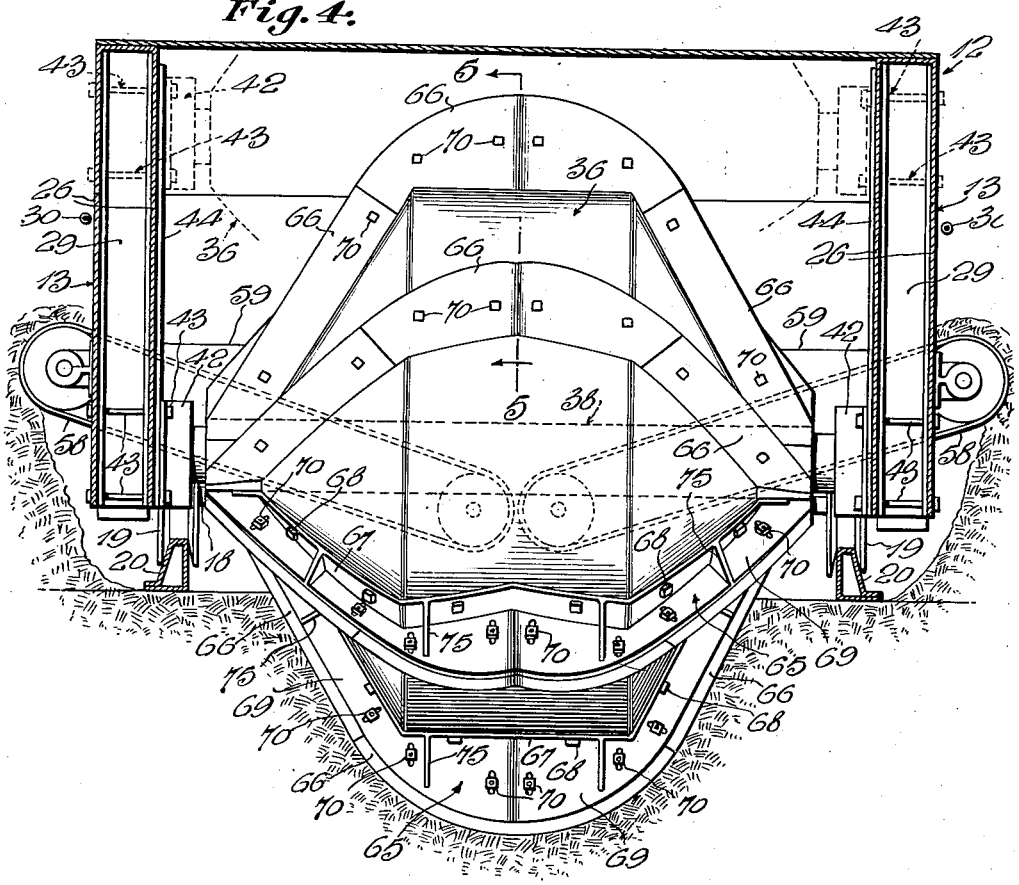
Fig. 4 is a vertical transverse section substantially on line 4—4 of Fig. 2.
Figure 9:
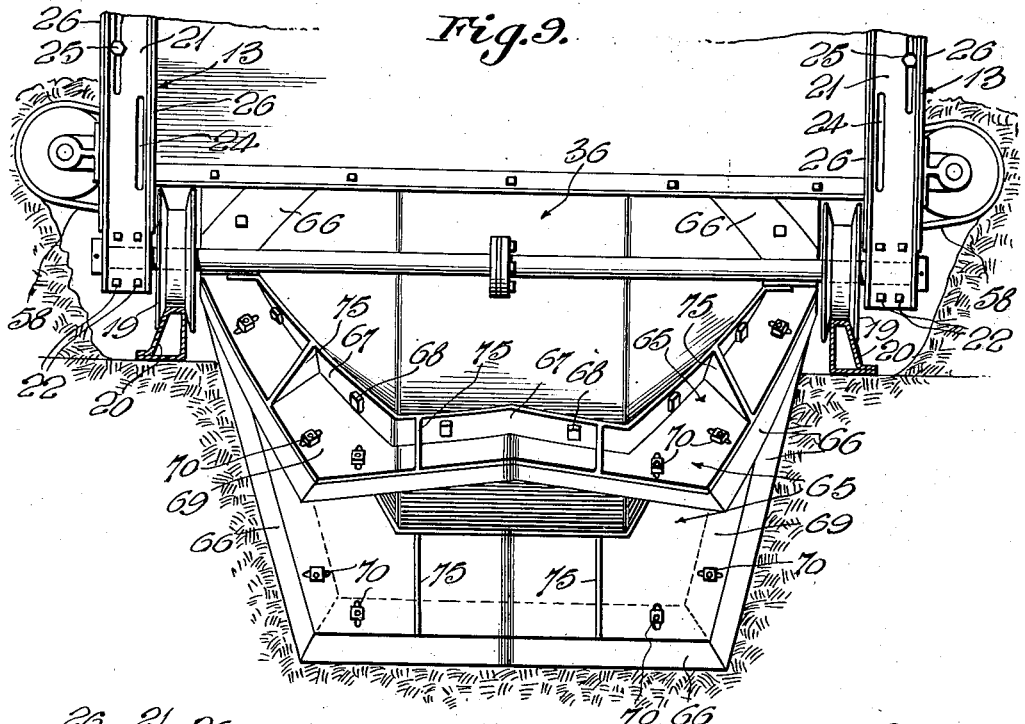
Figs. 9 and 10 are fragmentary front elevations showing two ways in which the digging drum is changed to form ditches of transverse shapes other than that shown in Figs. 3 and 4.
Figure 10:
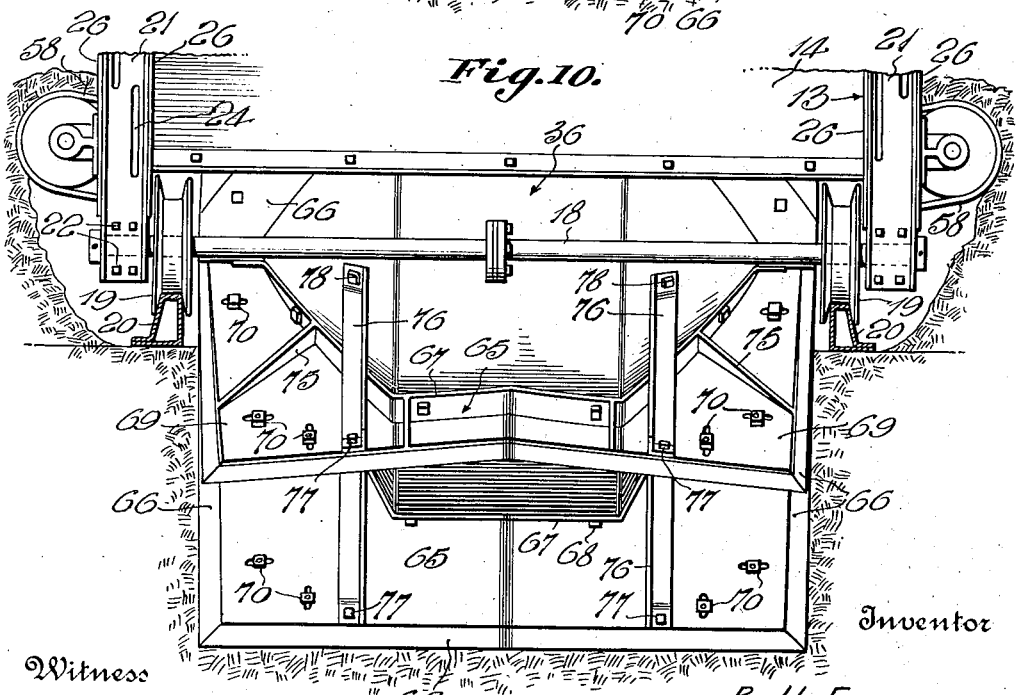

The blade-back-up-bars 65 and blades 66 may be of any desired peripheral shape, according to the desired shape for the ditches to be dug. The back-up-bars and blades shown in most of the views are shaped to form a curved-bottom ditch with flared sides as seen in Figs. 3 and 4;

those of Fig. 9 are shaped to form a flat-bottomed ditch with flared sides; and those of Fig. 10 are shaped to dig a flat-bottomed ditch with substantially vertical sides, which however, may upwardly diverge sufficiently to allow the blades to clear them as said blades travel upwardly and rearwardly from their lowermost positions.

Figure 5:
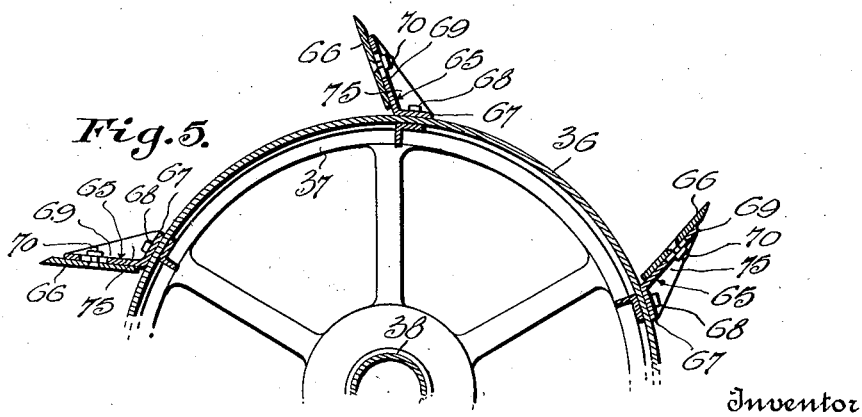
Fig. 5 is a detail vertical sectional view on line 5—5 of Fig. 4.

Regardless of its exact shape and proportions, each back-up-bar 65 is preferably of obtuse angular form in transverse section as shown most clearly in Fig. 5, one flange 67 of said bar being secured by cap-screws or the like 68 to the body of the drum 36 while the other flange 69 is secured by bolt-and-slot connections 70 to the blades 66. These blades are preferably formed of sections and the connections 70 permit slight adjustments of said sections for accuracy when securing the blades to the back-up-bars.

A back-stop-plate 71 is mounted directly behind the digging drum 36, in substantially concentric relation therewith, the front 72 of said back-stop-plate being adjusted to or shaped according to the transverse shape of the ditch. In top plan view, the back-stop-plate 71 corresponds roughly to the configuration of the blade-equipped digging drum to coact with the blades 66 substantially throughout the lengths of the latter. The earth dug by these blades is pushed upwardly along the back-stop-plate 71, principally along the central portion of the latter, and the dirt tumbles from the upper end of said back-stop-plate onto the conveyors 58 which carry it laterally and discharge it in windrows along the ditch.

In the present showing, I have shown the back-stop-plate 71 secured at 73 (Fig. 2) to the plates 42, and secured at 74 (Figs. 1 and 2) to the frame 59 of the conveyors 58. Whenever one set of blade-back-up-bars 65 and blades 66 is removed and a differently contoured set substituted, it is, of course, necessary to do likewise with the back-stop-plate 71.

While the operation of the machine would probably be obvious from the foregoing, it may be briefed as follows:—With the frame 12 raised sufficiently so that the cutting blades 66 are a slight distance above the surface of the ground, the digging drum 36 is driven. With this drum rotating, the frame is gradually lowered until the drum has cut to the desired depth of ditch. The frame is then locked against further descent, by means of the bars 21 and the cap-screws or the like 25. The conveyors 58 are, of course, driven simultaneously with the cutting drum, to carry off the dirt, and with said drum and conveyors continuing in operation, the wheeled supporting means of the frame is slowly driven to advance the entire machine. During such advance, the blades 66 successively shear the earth, the depth of cut being usually from one-fourth inch to one inch. These blades push the dirt upwardly along the back-stop-plate 71, and onto the conveyors 58, and the latter carry the dirt off to either or both sides of the ditch, and load it into trucks if desired. The speed of rotation of the cutting drum and the speed at which the machine is advanced, may be readily controlled according to the character of the earth in which the ditch is being formed. The conveyors 58 are always driven at sufficient speed to carry off the elevated earth as rapidly as it is discharged onto them.

I prefer to provide bracing webs 75 between the two flanges of each of the blade-back-up-bars 65 and when the flanges 69 are made unusually wide as seen in Fig. 10, additional bracing means 76 may be provided for them, said bracing means being shown in the form of bars secured at 77 to the flanges 69 and at 78 to the drum 36.

It will be seen from the foregoing that novel provision has been made for carrying out the objects of the invention, and attention is again invited to the possibility of making variations. Furthermore, the machine is not limited to ditch or trench formation but by suitably changing the cutters, may be used for cutting back slopes or shoulder slopes along pavements or roads as well as shaping the ditch, delivering the dirt into trucks or onto the shoulders of the pavement or road, as desired. When the conveyors are to load the dirt into trucks, they should be somewhat longer and possibly higher than shown, or provided with suitable extensions.

I claim:—

1. An over-cutting ditching machine comprising a wheeled supporting frame, a drum rotatably mounted on said frame upon a transverse axis, said drum being provided with projecting ditch digging blades, a back stop mounted on the frame immediately behind said drum, an engine on said frame, driving connections from said engine to said drum for driving said drum in a direction to cause its digging blades to push the dug earth upwardly along said back stop, said back stop extending upwardly only to such an extent that the upwardly pushed earth may tumble rearwardly from the upper end of said back stop, earth conveying means on the frame behind said back stop and positioned to receive the rearwardly tumbling earth from the upper end of said back stop, and driving connections from said engine to said earth conveying means and from said engine to the wheels of said frame.

2. An over-cutting ditching machine comprising a wheeled supporting frame, a drum rotatably mounted on said frame upon a transverse axis, said drum being provided with projecting ditch digging blades, an arcuate back stop mounted on the frame immediately behind and in substantially concentric relation with said drum, an engine on the frame, driving connections from said engine to said drum for driving the latter in a direction to cause its digging blades to push the dug earth upwardly along said back stop, said back stop extending upwardly only to such an extent that the upwardly pushed earth may tumble rearwardly from the upper end of said back stop, earth conveying means on the frame behind said back stop and positioned to receive the rearwardly tumbling earth from the upper end of said back stop, and driving connections from said engine to said earth conveying means and from said engine to the wheels of said frame.

3. An over-cutting ditching machine comprising a wheeled supporting frame, a drum rotatably mounted on said frame upon a transverse axis, said drum being provided with projecting ditch-digging blades, a back stop mounted on the frame immediately behind said drum, an engine on said frame, driving connections from said engine to said drum for driving said drum in a direction to cause its digging blades to push the dug earth upwardly along said back stop, earth conveying means on the frame positioned to receive the earth from the upper end of said back stop, and driving connections from said engine to said earth-conveying means and from said engine to the wheels of said frame; said ditch digging blades extending from points at one end of the drum near the drum axis across the drum periphery to corresponding points at the other end of the drum, said back stop being shaped to coact with substantially the full lengths of said blades.

4. In an over-cutting ditching machine, a mobile frame, a drum rotatably mounted on said frame upon a transverse axis, ditch digging blades secured to said drum and extending from points at one end of the drum near the drum axis, across the drum periphery to corresponding points at the other end of the drum, said blades being pitched to cause the ends thereof near the drum axis to strike the earth ahead of the intermediate portions of said blades when said drum is rotated in a direction to over-cut, and means for driving said drum in said direction and for propelling the machine.

5. A ditching machine comprising a supporting frame, wheeled supporting means upon which said frame is mounted for raising and lowering, a ditch digging wheel, bearings supporting the ends of said wheel and having vertical carrying plates, said frame having lower vertical surfaces for contact at one time with said carrying-plates of said bearings, and also having upper vertical surfaces for contact at another time with said carrying-plates of said bearings, and means for securing said carrying-plates of said bearings in contact with said lower vertical surfaces to relate the wheel and frame for use, and for securing said carrying-plates of said bearings in contact with said upper vertical surfaces when the machine is to be transported.

6. In a ditching machine, a rotatable drum whose diameter decreases toward the ends of said drum, said drum being closed at its periphery and ends, and ditch digging blades secured upon the exterior of said drum, said blades extending from points at one end of the drum near the drum axis, across the drum periphery to corresponding points at the other end of the drum.

7. In a ditching machine, a rotatable drum whose diameter decreases toward the ends of said drum, angle-metal blade-back-up-bars extending from points at one end of the drum near the drum axis, across the drum periphery to corresponding points at the other end of the drum, each of said bars having one flange secured to the drum and another flange projecting outwardly from said drum, and digging blades secured to the outwardly projecting flanges of said bars.

8. In an overcutting ditching machine, a drum, and a plurality of ditch-digging blades spaced apart circumferentially of said drum and secured thereto, said blades each having two arm portions at its ends respectively and an intermediate portion extending between the inner ends of said arm portions, whereby each blade is given a U-shape, said U-shaped blades being disposed astride said drum with their arm portions at the ends of said drum and their intermediate portions at the periphery of said drum.

9. In an overcutting ditching machine, a drum, and a plurality of ditch-digging blades spaced apart circumferentially of said drum and secured thereto, said blades each having two arm portions at its ends respectively and an intermediate portion extending between the inner ends of said arm portions, whereby each blade is given a U-shape, said U-shaped blades being disposed astride said drum with their arm portions at the ends of said drum and their intermediate portions at the periphery of said drum, the free ends of said arm portions being disposed in close relation with the drum axis, said arm portions being pitched on lines tangential to a small circle concentric with said axis.

10. In an overcutting ditching machine, a drum, a plurality of angle metal blade-back-up-bars spaced apart circumferentially of said drum and each having one of its flanges secured to the drum and its other flange projecting from said drum, said bars each having two arm portions at its ends respectively and an intermediate portion connecting the inner ends of said arm portions, whereby each bar is given a U-shape, said U-shaped bars being disposed astride said drum with their arm portions at the ends of said drum and their intermediate portions at the periphery of said drum, and U-shaped digging blades secured against the outwardly projecting flanges of said bars and extending from end to end thereof.

BENJAMIN H. FLYNN.